United States Patent [19]

Taguchi

[11] Patent Number: 4,901,605
[45] Date of Patent: Feb. 20, 1990

[54] ARRANGEMENT FOR DISCHARGING BAND SERVO OPERATING HYDRAULIC PRESSURE IN AUTOMATIC TRANSMISSION

[75] Inventor: Hiromi Taguchi, Zama, Japan

[73] Assignee: Nissan Motor Co., Ltd., Yokohama, Japan

[21] Appl. No.: 176,012

[22] Filed: Mar. 31, 1988

[30] Foreign Application Priority Data

Mar. 31, 1988 [JP] Japan .................. 62-46997[U]

[51] Int. Cl.$^4$ .................................................. F16H 57/02
[52] U.S. Cl. .................................... 74/606 R; 475/146
[58] Field of Search .............. 74/606 R, 867, 730, 74/607

[56] References Cited

U.S. PATENT DOCUMENTS

| | | | |
|---|---|---|---|
| 4,631,980 | 12/1986 | Ishimori | 74/730 |
| 4,640,152 | 2/1987 | Quick et al. | 74/606 R X |
| 4,693,141 | 9/1987 | Iwanaga | 74/606 R |
| 4,738,159 | 4/1988 | Kato et al. | 74/606 R |

FOREIGN PATENT DOCUMENTS 217859 12/1983 Japan .................. 74/606 R

Primary Examiner—Peter A. Aschenbrenner
Attorney, Agent, or Firm—Foley & Lardner, Schwartz, Jeffery, Schwaab, Mack, Blumenthal & Evans

[57] ABSTRACT

In an automatic transmission, an arrangement for discharging band servo operating hydraulic pressure comprises an upstanding passage and a communication passage formed in a transmission case, and a discharge valve installed in the communication passage. The upstanding passage is so formed as to extend inwardly or upwardly from a control valve body joining surface of the transmission case. The communication passage is so formed as to extend inwardly from an outer peripheral portion of the transmission case adjacent an oil pump cover joining surface thereof to fluidly connect a servo cylinder chamber to the upstanding passage which is in turn fluidly connected to a servo release passage of a control valve assembly. The discharge valve is in the form of a check valve and disposed in the open end of the communication passage which is located at the above described peripheral portion of the transmission case adjacent the oil pump cover joining surface thereof.

4 Claims, 4 Drawing Sheets

ARRANGEMENT FOR DISCHARGING BAND SERVO OPERATING HYDRAULIC PRESSURE IN AUTOMATIC TRANSMISSION

BACKGROUND OF THE INVENTION

1. Field of the Invention

The present invention relates in general to automatic transmission hydraulic control and more particularly to an arrangement for discharging band servo operating hydraulic pressure in an automatic transmission.

2. Description of the Prior Art

An example of this kind of arrangement is shown in FIG. 5, which is utilized in an automatic transmission of the General Motor's THM700 type. In the figure, a transmission case is shown having a joining surface 1a to be joined with a control valve body (not shown), a brake chamber, a servo release passage 3 extending from the joining surface 1a toward the brake chamber 2, a discharge valve 4 for discharging band servo operating hydraulic pressure, a brake band 5 which is controlled by a band servo 8, a piston 6 of the band servo 8 and a cylinder chamber 7 of the band servo 8.

In the prior art arrangement, the discharge valve 4 needs to be inserted into the servo release passage 3 through its open end at the joining surface 1a and be pushed deeply thereinto, i.e., deeply toward the brake chamber 2 side. Such an insertion results in an awkward and difficult assembling work, a complex structure of the discharge valve 4 and therefore expensive manufacturing and assembling costs.

SUMMARY OF THE INVENTION

In accordance with the present invention, there is provided an improved arrangement for discharging band servo operating hydraulic pressure in an automatic transmission, which comprises a transmission case having a control valve body joining surface, an oil pump cover joining surface and a servo cylinder chamber, servo release passage means, upstanding passage means formed in the transmission case in such a manner as to have at the control valve body joining surface a lower open end fluidly connected to the servo release passage means and an upper closed end, communication passage means formed in the transmission case in such a way as to have an open end adjacent the oil pump cover joining surface and the other end fluidly connected to the upper end of the upstanding passage means, the communication passage means being communicated with the servo cylinder chamber at a passage portion between the above mentioned ends thereof and a discharge valve disposed in the above mentioned open end of the communication passage means for controlling discharge of band servo operating hydraulic pressure therethrough.

The above structure is effective for solving the above noted problem inherent in the prior device.

It is accordingly an object of the present invention to provide an improved arrangement for discharging band servo operating hydraulic pressure in an automatic transmission which can attain installation of a discharge valve with ease and efficiency.

It is another object of the present invention to provide an improved arrangement of the above described character which can make the discharge valve simpler in structure.

It is a further object of the present invention to provide an improved arrangement of the above described character which can reduce the manufacturing and assembling cost.

DETAILED DESCRIPTION OF THE PREFERRED EMBODIMENT

Figure 1:
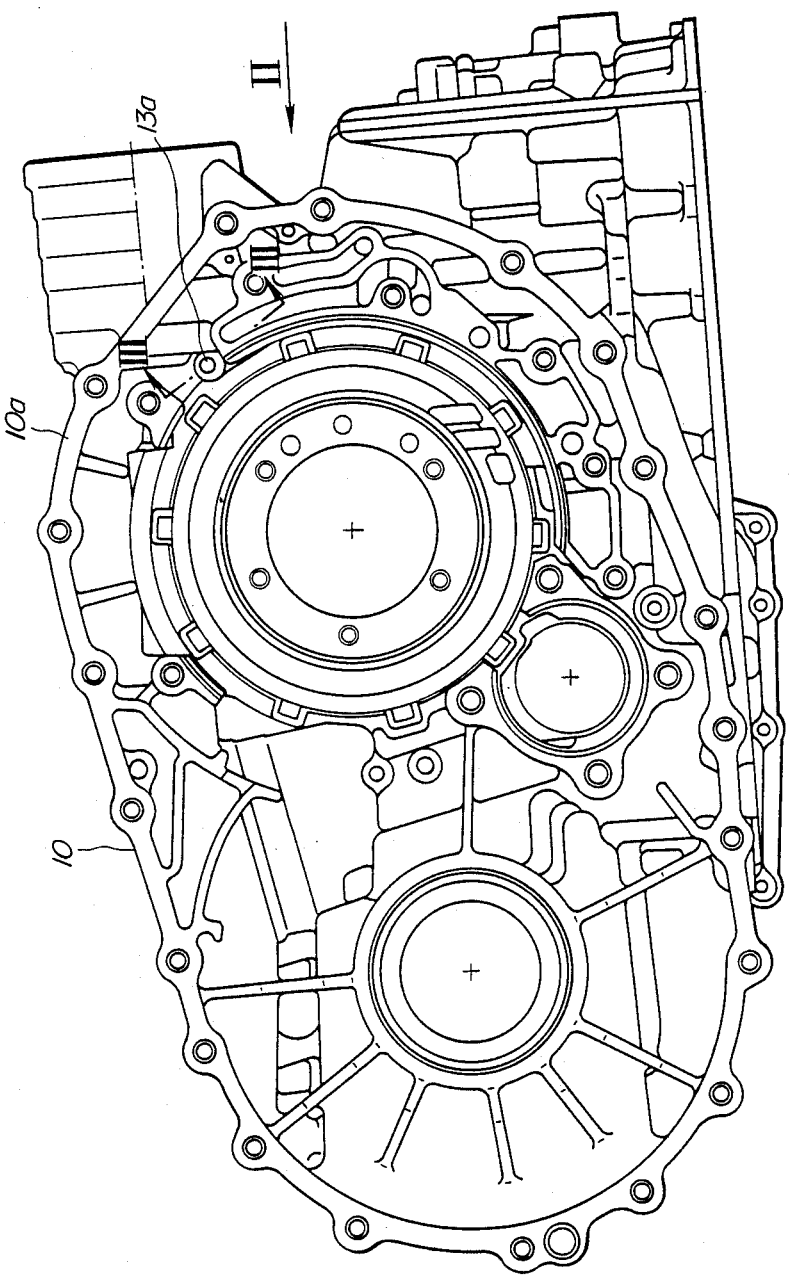
FIG. 1 is a converter housing side end elevational view of a transmission case incorporating an arrangement for discharging band servo operating hydraulic pressure according to an embodiment of the present invention.

Referring to FIGS. 1 to 4, an arrangement for discharging band servo operating hydraulic pressure comprises a transmission case 10. The transmission case 10 has a converter housing outer surface 10a to be joined with a converter housing (not shown), an oil pump cover outer surface 10b (refer to FIG. 3) to be joined with an oil pump cover (not shown), a control valve body outer surface 10c (refer to FIG. 4) to be joined with a control valve body (not shown) and a servo cylinder chamber 11 passing through transmission case 10 (refer to FIGS. 2 and 4).

Figure 2:
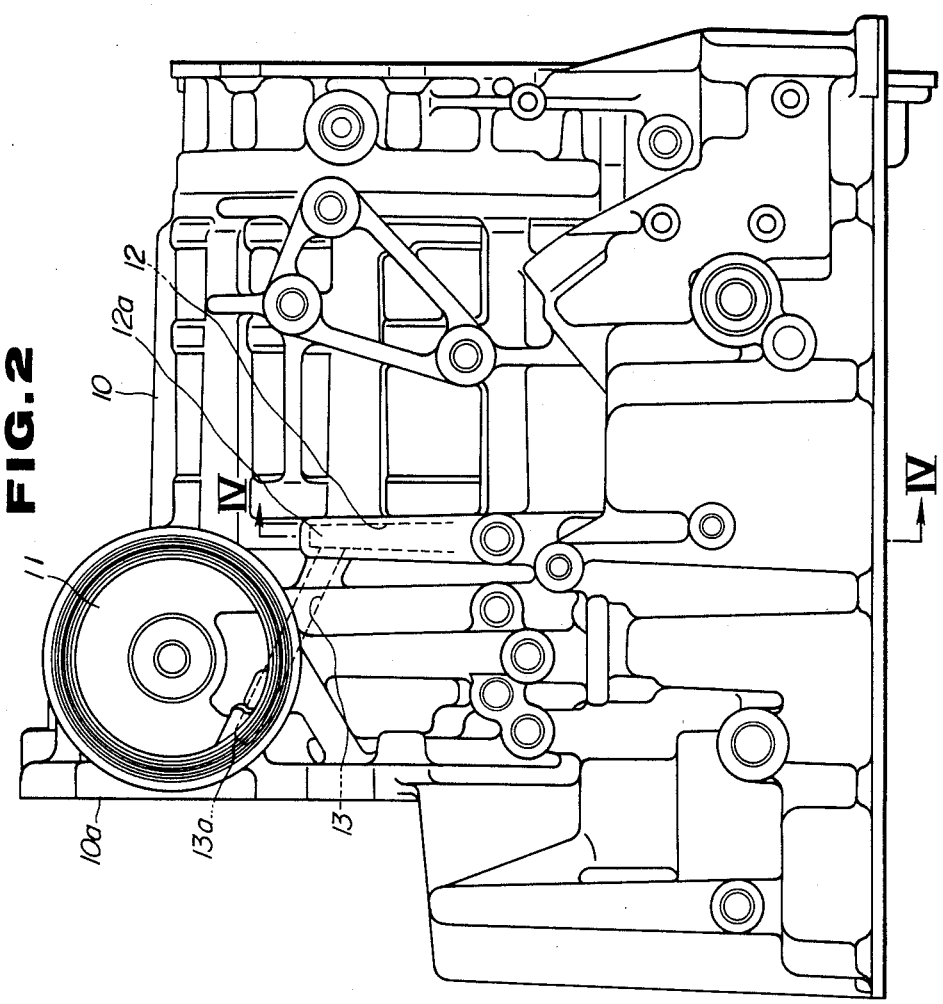
FIG. 2 is a view taken in the direction of the arrow II of FIG. 1.
Figure 3:
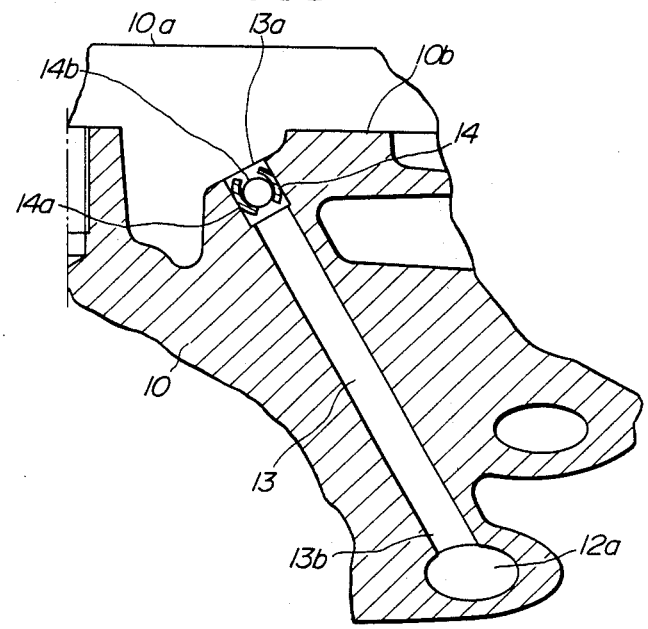
FIG. 3 is a sectional view taken along the line III—III of FIG. 1.
Figure 4:
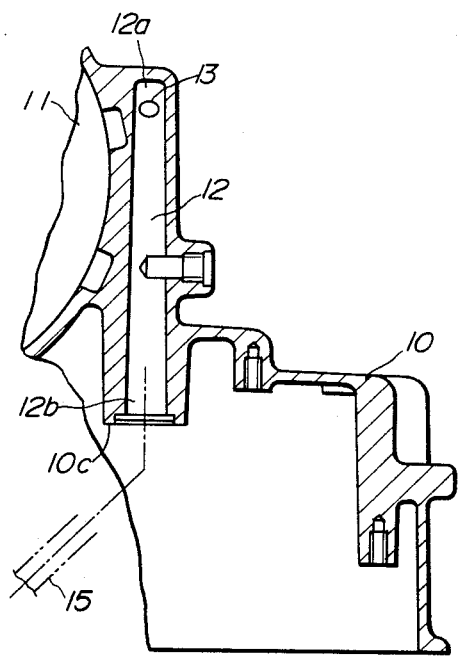
FIG. 4 is a sectional view taken along the line IV—IV of FIG. 2.
Figure 5:
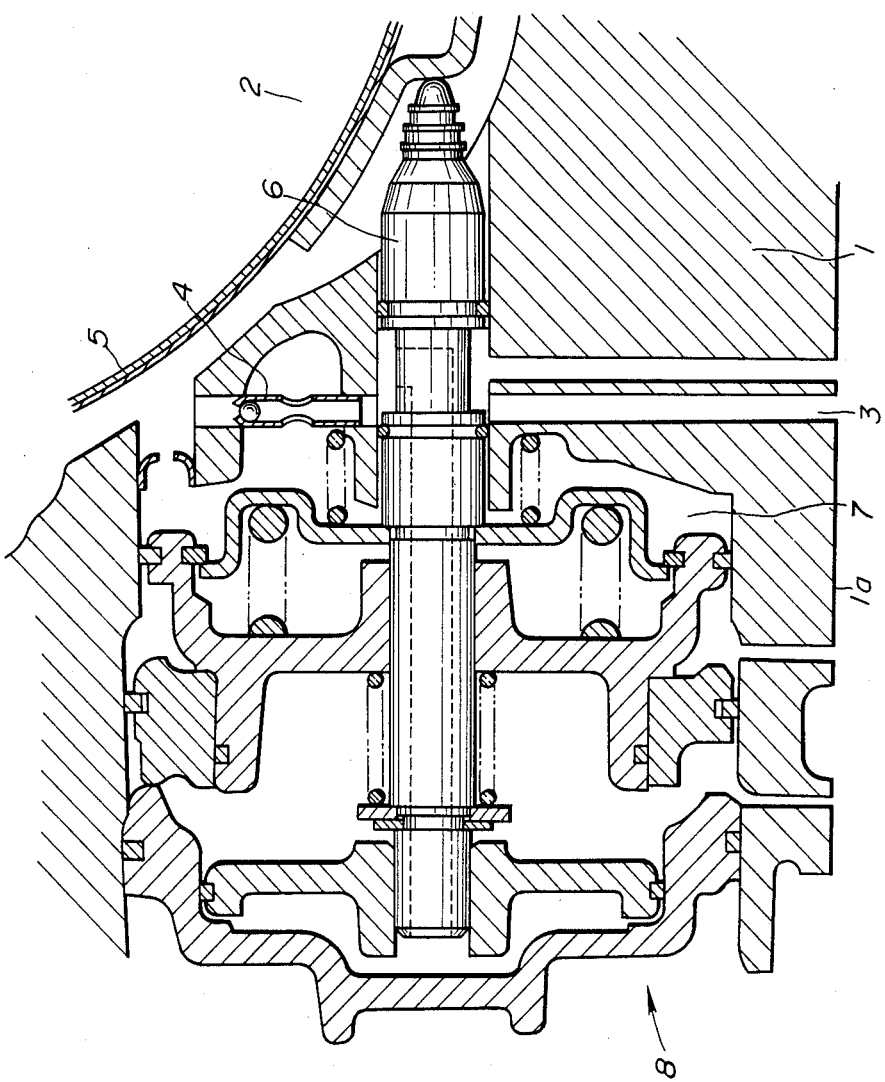
FIG. 5 is a sectional view of a prior art arrangement.

As shown in FIGS. 2 and 4, an upstanding passage 12 is formed in the transmission case 10 in such a way as to have a closed upper end 12a and a lower open end 12b, which lower open end 12b is located at the control valve body outer surface 10c. The upstanding passage 12 is communicated at the lower open end 12b with a servo release passage 15 of a control valve assembly. Servo release passage 15 is located at the outer value body joining outer surface 10c and extends from the transmission case 10. On the other hand, as shown in FIGS. 2 and 3, a passage 13 is formed in the transmission case 10 in such a way as to have an open end 13a adjacent the oil pump cover outer surface 10b and the other end 13b communicated with the upper end 12a of the above described upstanding passage 12. The communication passage 13 is also fluidly connected to the servo cylinder chamber 11 at a passage portion between the opposed ends 13a and 13b thereof. In other words, as seen from FIG. 2, the communication passage 13 is so drilled or otherwise formed as to straightly extend from an outer peripheral portion of the transmission case 10 adjacent the oil pump cover outer surface 10b to the upper end 12a of the upstanding passage 12 while passing at a passage portion thereof the servo cylinder chamber 11. The open end 13a of the communication passage 13 is thus formed or located at the above described peripheral portion of the transmission case 10 adjacent the oil pump cover outer surface 10b. A discharge valve 14 for controlling the discharge of band servo operating hydraulic pressure is inserted into the communication passage 13 through the open end 13a located adjacent the the oil pump cover outer surface 10b. The discharge valve 14 is fixed in place adjacent the open end 13a of the communication passage 13, i.e., an oil pump side end 13a thereof. Indicated by the reference numeral 14a is a hollow cylindrical member of the discharge valve 14. The opposed ends of the cylindrical member 14a are reduced in diameter so as to hold within the cylindrical member 14a a steel ball 14b adapted to serve as a check valve.

From the foregoing, it will be understood that the structure of the discharge valve 14 can be simple as well as the installation of the discharge valve 14 can be attained with ease and efficiency since the communication passage 13 is formed so as to extend inwardly from an outer peripheral portion of the transmission case 10 adjacent the oil pump cover outer surface 10b to fluidly connect the servo cylinder chamber 11 to the upstanding passage 12 which is in turn fluidly connected to the servo release passage 15 and the discharge valve 14 is installed in the communication passage 13 at the outer open end 13a thereof, i.e., at the oil pump side end 13a thereof.

What is claimed is:

1. An arrangement for discharging servo piston operating hydraulic pressure in an automatic transmission, comprising:
    a transmission case having a control valve body joining outer surface, an oil pump cover outer joining surface, and a servo cylinder chamber passing through said transmission case;
    servo release passage means located at said control valve body joining outer surface and extending from said transmission case;
    upstanding passage means formed in said transmission case in such a manner as to have at said control valve body joining outer surface a lower open end fluidly connected to said servo release passage means and an upper closed end;
    communication passage means formed in said transmission case in such a way as to have an open end adjacent said oil pump cover joining outer surface and the other end fluidly connected to said upper closed end of said upstanding passage means;
    said communication passage means being communicated with said servo cylinder chamber at a passage portion between said open and other ends thereof; and
    a discharge valve disposed in said open end of said communication passage means for controlling discharge of band servo operating hydraulic pressure therethrough.

2. An arrangement as set forth in claim 1 wherein said discharge valve comprises a hollow cylindrical member which are reduced in diameter at its opposed ends thereof and a steel ball disposed in said hollow cylindrical member in such a way as to serve as a check valve.

3. An arrangement as set forth in claim 1 wherein said communication passage extends straightly inwardly from an outer peripheral portion of said transmission case, said open end being formed at said outer peripheral portion of said transmission case.

4. An arrangement as set forth in claim 3 wherein said communication passage passes said servo cylinder chamber at a passage portion between said open and other ends thereof.

* * * * *